United States Patent
Wyland

[15] 3,650,366
[45] Mar. 21, 1972

[54] EGG HANDLING CONVEYOR EQUIPMENT

[72] Inventor: Roy Bruce Wyland, Arcadia, Calif.
[73] Assignee: J. W. Wyland & Sons, Inc., San Gabriel, Calif.
[22] Filed: June 26, 1969
[21] Appl. No.: 836,703

[52] U.S. Cl. ........................................................198/30
[51] Int. Cl. ....................................................B65g 47/26
[58] Field of Search ..............................198/30, 183; 29/110

[56] References Cited

UNITED STATES PATENTS 2,488,230  11/1949  Page ..........................................198/30
2,961,087  11/1960  Reading ...................................198/30 X
3,147,844  9/1964  Mountz ...................................198/183 X Primary Examiner—Edward A. Sroka
Assistant Examiner—Douglas D. Watts
Attorney—Jessup & Beecher

[57] ABSTRACT

An improved egg handling machine is provided on which eggs are loaded and are conveyed in successive rows of, for example, six eggs abreast, and in which each row is subsequently separated into two longitudinally spaced rows of three eggs abreast each, for example, with the eggs from the two longitudinally spaced rows being fed to corresponding tandem conveyors so that the eggs may be conveyed to other egg handling machinery in each of the tandem conveyors in single file and with a longitudinal orientation.

4 Claims, 4 Drawing Figures

INVENTOR:
Roy Bruce Wyland

By Warren T. Jessup
ATTORNEYS

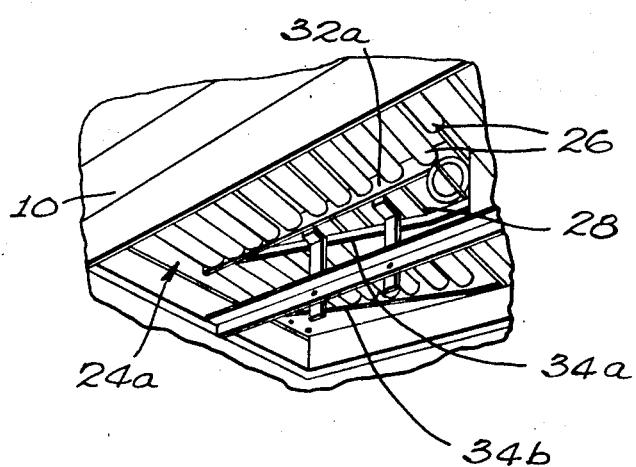

EGG HANDLING CONVEYOR EQUIPMENT

Briefly stated, the invention provides conveyor equipment which accepts eggs in rows of six abreast, for example, from a standard washer or mass-candler, or other source. The conveyor equipment of the invention then automatically converts each successive row of six eggs abreast into two rows of three eggs abreast, for example, and aligns and feeds the eggs of each of the latter rows into two conveyors each of which carries the eggs in single file to egg grading station, or other appropriate destinations.

BACKGROUND OF THE INVENTION

For the mechanized grading of eggs, it is usually desirable that the eggs be transported to the mechanical grader on a conveyor in a single file, with the eggs longitudinally oriented and one behind the other. One or two separate conveyors may be used for this purpose, with the conveyors transporting the eggs to corresponding graders, or other destination. For maximum efficiency, the eggs from the washer or candler should be received in successive rows, with a plurality of eggs in each row numbering, for example, six abreast. However, it is difficult to transform each successive row of six eggs into the single file row of longitudinally oriented eggs which is required for the grading operation.

It is much simpler, for example, to convert successive rows of three eggs abreast into a single file row. Therefore, attempts have been made in the past to separate the successive rows of six eggs abreast into two series of rows of three eggs abreast. However, such attempts in the prior art have usually been carried out by means of deflectors which act directly on the eggs. That is, the prior art deflectors attempted to force the eggs to slide laterally along the conveyor rollers, and this did not meet with any measure of success.

In the mechanism to be described, the eggs in the successive rows of six, for example, are carried on transverse rollers which are mounted in pairs coaxially on transverse rods. The rollers of each pair are then deflected longitudinally on each of the support rods and carry the support eggs with them. In this way, the successive rows of six eggs abreast, are deflected into successive rows of three eggs abreast. The successive rows of three eggs abreast may then be easily handled, with the rows being transformed into two single file rows and conveyed as such to the grading stations.

BRIEF DESCRIPTION OF THE DRAWINGS

FIG. 4 is a bottom view, like FIG. 3, and showing deflectors which act on the rollers to return them to their original position.

DETAILED DESCRIPTION OF THE ILLUSTRATED EMBODIMENT

Figure 1:
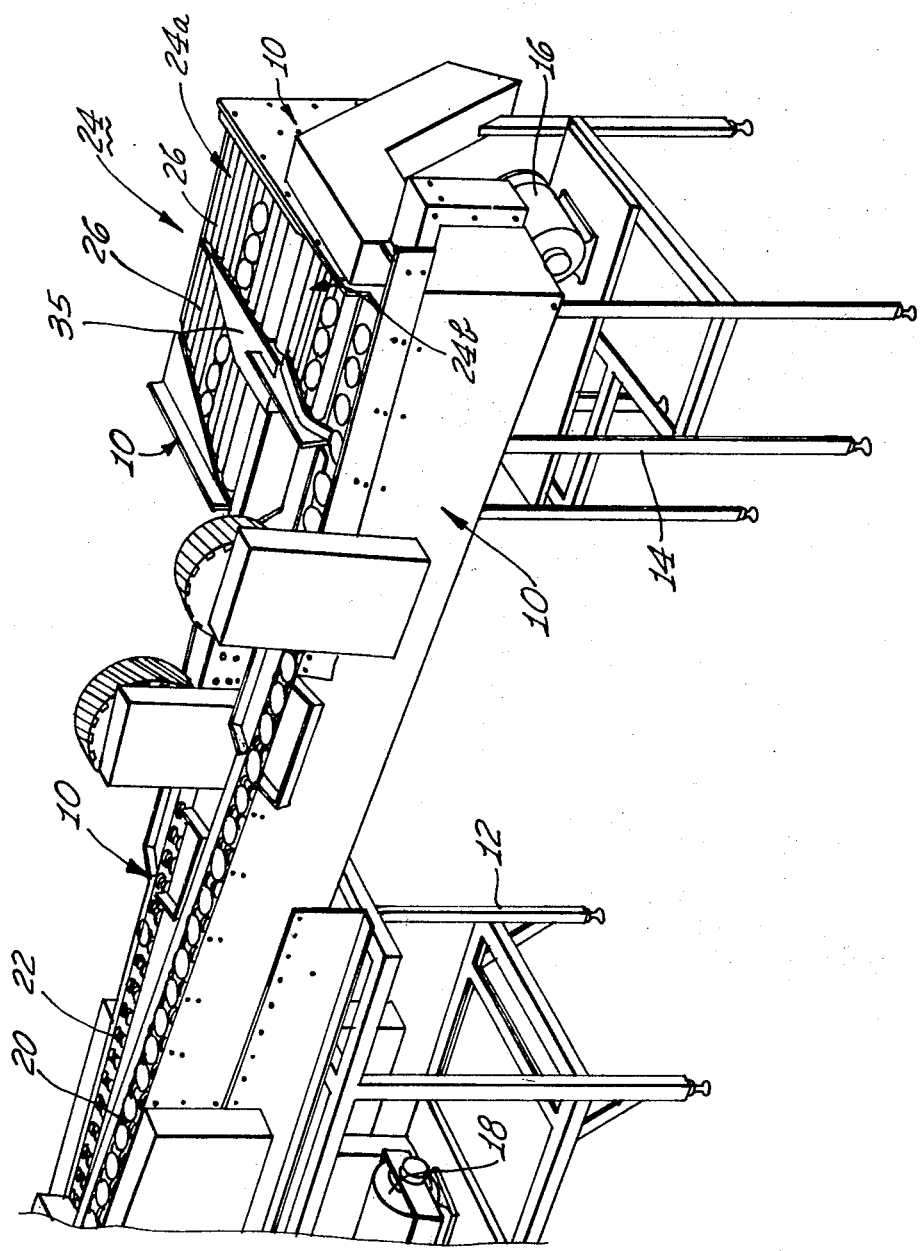
FIG. 1 is a perspective representation of egg handling equipment incorporating the concepts of the invention.

The equipment illustrated in the drawing includes a frame 10 which is supported on appropriate mounting brackets 12 and 14, as shown. The brackets 12 and 14 may include shelves which, in turn, support drive motors, such as the motors 16 and 18 which drive various conveyors in the equipment.

The equipment of FIG. 1 includes a first conveyor 20 which may be of usual construction, and which is driven in a direction towards the upper left hand corner of FIG. 1 to convey eggs in single file, and with a longitudinal orientation, for example, to a mechanical grading station. An adjacent conveyor 22 also extends towards the upper left hand corner of FIG. 1 adjacent the conveyor 20. The conveyor 22 also serves to convey eggs in single file to the grading stations, with their longitudinal axis extending along the path of movement.

A further conveyor 24 which incorporates the concepts of the invention, extends essentially transversely to the conveyors 20 and 22, and the latter conveyor receives eggs from the washing station, for example, in rows of six abreast, and conveys the successive rows of eggs down towards the single file conveyors 20 and 22.

Figure 2:
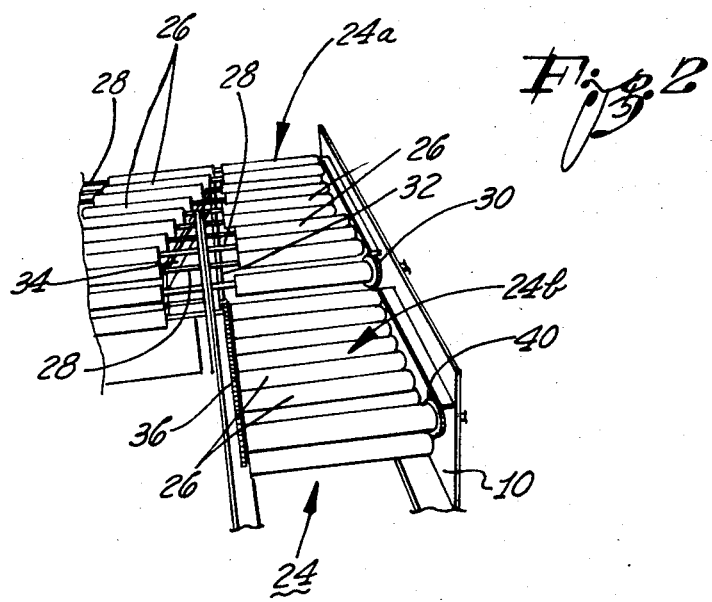
FIG. 2 is a top perspective view of a portion of the equipment of FIG. 1, with various guards removed to expose internal operating components.

The conveyor 24, as best shown in FIG. 2 is made up of a first conveyor section 24a which, in turn, is composed of a plurality of tubular roller members 26 freely mounted in pairs coaxially on respective transverse rods 28. The rods and their rollers are transported from the top of the representation of FIG. 2 towards the bottom by a chain, such as the chain 30, and by a similar chain on the other side of the rods 28 (not shown).

Figure 3:
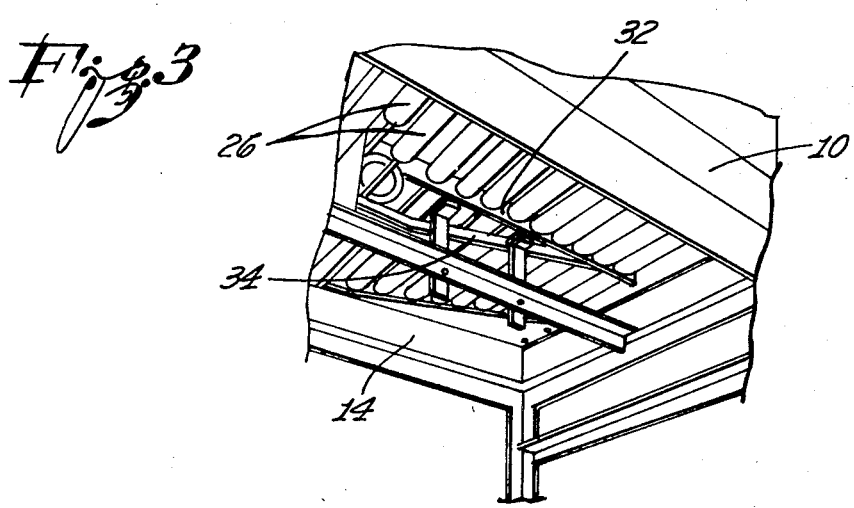
FIG. 3 is a bottom view of a portion of the machine, and showing deflectors which at on rollers incorporated into the conveyors of the machine, as will be described.

The rods 28 are transported by the chains, such as the chain 30, in usual conveyor fashion, and driven by an appropriate drive motor, such as the motor 16, so that the rollers 26 move in unison down from the top of FIG. 2 towards the bottom, and then return on the underside of the equipment, such as shown in FIG. 3. The rollers 26 may be formed, for example, of an appropriate plastic such as polyvinyl chloride, and they may incorporate suitable bushings, composed, for example, of nylon. The rollers 11 are journaled on the transverse rods 28 which may, for example, be composed of stainless steel. The rollers are freely slidable along the rods. Therefore, as the rods are moved around the conveyor section 24a, the rollers 26 are carried around the closed circuit.

As shown in FIGS. 2 and 3, for example, the rollers 26 are supported in pairs on the rods 28 in the conveyor section 24a, and as the rollers advance from the top towards the bottom of FIG. 2, they are caused to separate and move longitudinally along the rods, by a pair of deflectors designated 32 and 34 in FIG. 3. The deflectors 32 and 34 are disposed under the path of the rods 28, and they are shaped so that the rollers 26 on the right hand side of the rods in FIG. 2, for example, proceed along a more or less straight path along the conveyor 24a, whereas the rollers 26 on the left hand side of the rods are deflected to the left and away from the first group of rollers.

The eggs are carried by the conveyor section 24a in successive rows of, for example, six abreast. As they are carried, the movement of the left hand rollers 26 in FIG. 2 causes three of the eggs of each row on the conveyor to be displaced laterally. This lateral displacement is assisted by a guide plate 35 (FIG. 1) which is positioned on the frame 10 over the deflectors 32 and 34.

The conveyor 24 also includes a second section 24b which is adjacent the front end of the right hand group of rollers of the conveyor section 24a. The conveyor section 24b includes similar rollers 26 to those carried by the section 24a, and these latter rollers are driven on similar transverse rods 28 which, in turn, are driven by chains 38 and 40 coupled to the drive motor 16. The conveyor section 24b receives and serves to carry the eggs from the right hand rollers of the section 24a in the same direction across an intervening space to the conveyor 20; whereas the eggs from the left hand rollers of the conveyor section 24a are loaded directly onto the conveyor 22.

It will be appreciated, therefore, and with special reference to FIG. 1, that the eggs originally loaded in the upper right hand corner of the equipment of FIG. 1 onto the conveyor 24 are carried by the rollers 26 in successive rows of, for example, six eggs abreast. Then, as the rollers of the conveyor section 24a meet the deflectors 32 and 34, the rollers 36 of the left hand side of the conveyor section 24a in FIG. 1 are deflected along their rods 28 to the left of FIG. 1, and the eggs carried by the rollers are also guided to some extent by the plate 35.

Since there is no attempt to move any egg longitudinally along a roller surface, the separation of the eggs of each row of the conveyor section 24a into two rows of three eggs each, for example, is accomplished smoothly and easily. Then, the eggs of each of the separated rows are dropped, either directly into the tandem conveyor 22, or by way of the conveyor section 24b into the tandem conveyor 20, to assume a single file longitudinally oriented position in each of the latter conveyors.

It will be appreciated, therefore, that as the rollers 26 of the conveyor section 24a are advanced by that section, they are free to slide on their rods 28; and as the rollers on the left hand side of the conveyor section 24a meet the deflector 34, they are deflected along their corresponding rods 28 to the left in FIG. 1, as shown. By the time the forward end of the conveyor section 24a is reached, the eggs of each row are separated into two groups of longitudinally aligned eggs, with the eggs in each group being displaced by a substantial amount.

In the illustrated embodiment, it will be appreciated that only one of the deflectors 32 and 34 is actually inclined outwardly to any appreciable extent, rather than providing a symmetrical arrangement whereby both of the deflectors 32 and 34 would extend in a flared relationship to a central axis. This is merely for mechanical convenience, since with only the one deflector actually being inclined, the required modifications to the basic machinery may be kept at a minimum.

For example, in the illustrated embodiment of FIG. 1, the right hand portion of the conveyor section 24a is similar to the conventional conveyor, and need not be modified. The only modification is the provision of the left hand section of the conveyor, as described above. It is of course immaterial which of the two sides of the conveyor section 24a is actually deflected.

The use of the deflectors 32 and 34 acting on the rollers 26 themselves, eliminates any attempt to force the eggs to slide laterally along the rollers, which is not feasible. The deflection of the rollers laterally as described above, precludes any need for the eggs themselves to slide laterally on the rollers, and the eggs are thus maintained in good alignment in each row, in a three abreast condition in a particular constructed embodiment.

Thus, the rollers themselves carry the eggs laterally to perform the desired deflection of the individual rows, so that there is no need for the deflectors to slide eggs themselves. A complementing deflector (FIG. 4) is included underneath the mechanism to return the rollers on each rod 28 in the section 24a of the conveyor to their original side-by-side relationship at the entrance end of the conveyor, as illustrated in FIG. 1. The complementing deflector, as shown, includes deflectors 32a, as well as deflectors 34a and 34b. The guard plate 35 is configured so as to maintain the eggs in their desired relationship in each row, as they are laterally shifted by the movement of the rollers.

The deflector 32 may be angled slightly so as to provide a wedging action to the rollers on the right hand side of the section 24a so as to prevent any tendency for the eggs on the right hand side to move up over the guide plate 35.

The invention provides, therefore, improved equipment for handling eggs, and by which eggs may conveniently be carried from a washing station and loaded into a plurality of linear conveyors, which individually convey a single file of eggs, all with their longitudinal axis aligned with the direction of movement, so that the eggs may conveniently be carried to mechanical grading stations.

What is claimed is:

1. An egg handling apparatus comprising : a frame ; an endless conveyor mounted upon said frame, said conveyor including a plurality of spaced-apart parallel rods extending transverse to the direction of movement of said conveyor, and a pair of spaced chain means mounted on said frame for supporting the rods in their spaced apart relationship and for driving the rods along the aforesaid direction of movement of said conveyor ; a first elongated and substantially cylindrical roller and a second roller of similar configuration supported upon each of said rods, each of said second rollers being slidably mounted upon its respective rod ; first deflector means mounted on said frame including a first deflector plate angularly inclined with respect to the aforesaid direction of movement of said conveyor in position to contact said second roller as said second rollers move past said first deflection plate to shift said second rollers apart from said first rollers to a maximum spacing position ; second deflector means mounted on said frame in position to return said second rollers to a minimum spacing position with respect to said first rollers ; and a guide plate associated with said first deflector means to serve as a guide for eggs carried by said first and second rollers ; said first deflector means being located on the side of said rods which is opposite to the egg carrying side, and said guide plate being located on the egg carrying side of said rods.

2. The apparatus as defined in claim 1, wherein : said first rollers are also slidable upon their respective rods ; and said first deflector means includes a second deflector plate in position to contact said first rollers as said first rollers move past said second deflector plate, said second deflector plate being located substantially in-line with the direction of conveyor movement.

3. The apparatus as defined in claim 1, and which includes a second conveyor and a third conveyor wherein : said first rollers deposit eggs on said second conveyor, and said second rollers deposit eggs on said third conveyor, the eggs to be located on said second and third conveyors in a single file relationship.

4. The apparatus as defined in claim 3, wherein : the direction of movement of said second conveyor is substantially transverse to the direction of movement of said first rollers, and the direction of movement of said third conveyor is substantially transverse to the direction of movement of said second rollers.

* * * * *